W. H. BROWN.
VIBRATION RECORDER.
APPLICATION FILED MAR. 26, 1912.
1,039,093.
Patented Sept. 24, 1912.
2 SHEETS—SHEET 2.
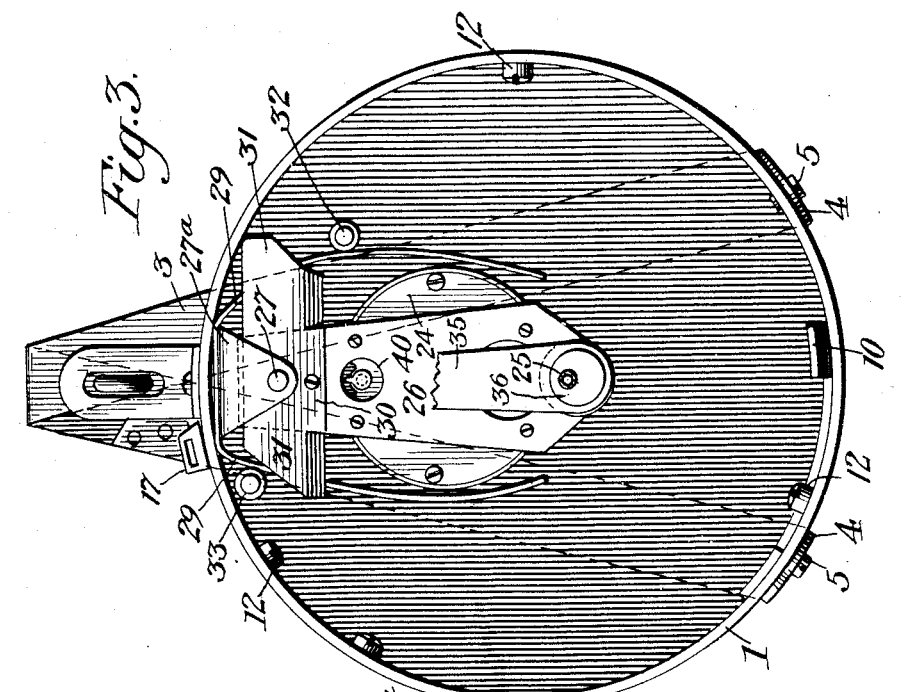
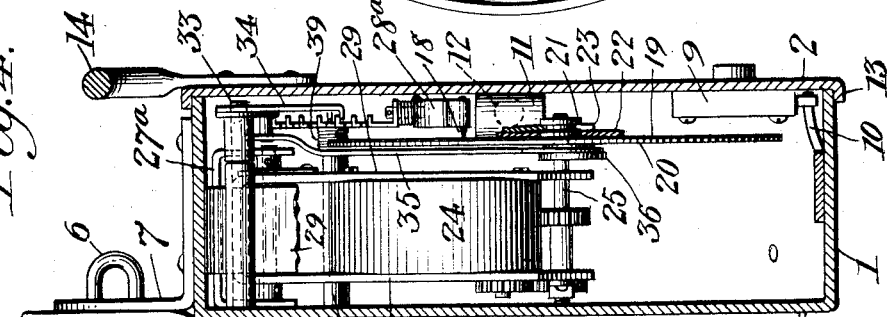
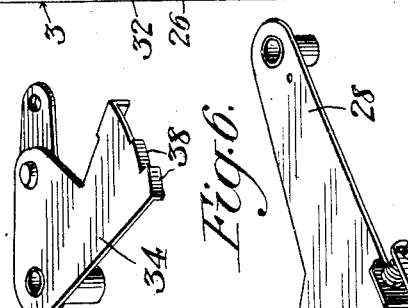
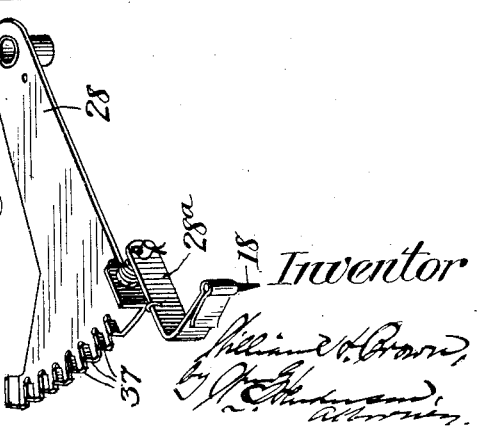
Witnesses.
Inventor

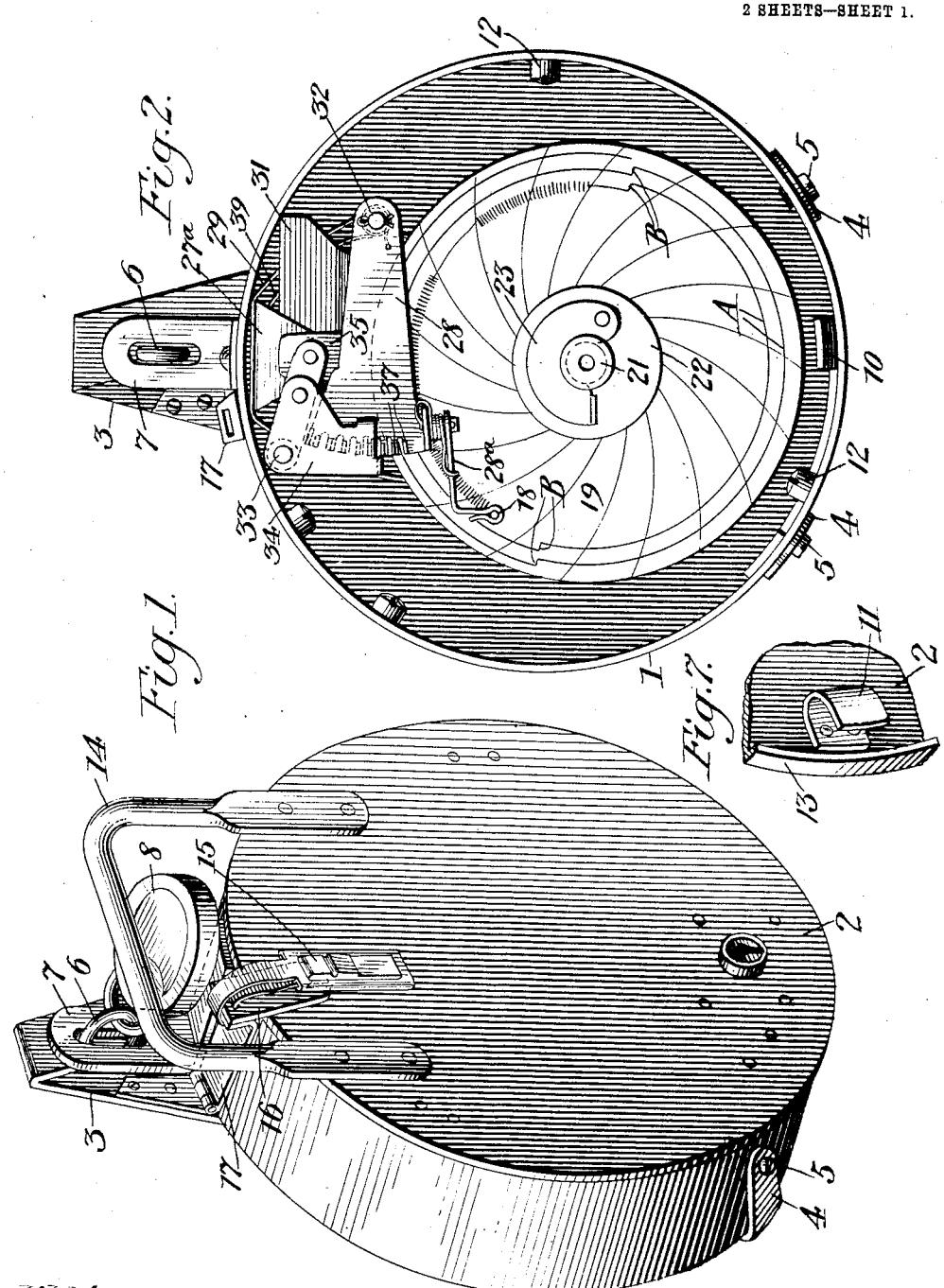

UNITED STATES PATENT OFFICE.

WILLIAM HIRAM BROWN, OF CLEVELAND, OHIO.

VIBRATION-RECORDER.

1,039,093.  Specification of Letters Patent.  Patented Sept. 24, 1912.

Application filed March 26, 1912. Serial No. 686,379.

*To all whom it may concern:*

Be it known that I, WILLIAM H. BROWN, a citizen of the United States, residing at Cleveland, in the county of Cuyahoga and State of Ohio, have invented certain new and useful Improvements in Vibration-Recorders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in vibration recorders such as are used in connection with automobiles or other vehicles to furnish a permanent record of the periods of use, both as to time and duration, and, of that type which comprehends a chart or record receiving element calibrated as to time values, a marker or recording point operative, when the machine is idle to trace upon the chart a characteristic line, of even or regular character, and when the machine is in use and the mechanism is subject to its vibrations, to trace upon the chart a characteristic zone or band made up of small zigzag lines, and a clock mechanism for producing a continuous relative movement of the chart and the marker in accordance with the calibrations of the chart.

The principal object of the invention, briefly stated, is to provide an exceedingly simple, sensitive, and accessible construction for carrying out the operations referred to and in furtherance of this object the invention involves an improvement in the organization for causing the vibrating or zig-zag tracing action of the marker or recording point; and an improvement in the organization for relatively positioning the marking point and the chart in accordance with the transitions from one daily record to another, assuming as is usually the case, that the chart covers a period of several days, e. g. a week or eight days.

Further objects of the invention are to provide improvements in the means for mounting the instrument upon the machine in connection with which it is to be employed, and in the means for indicating that the instrument has been tampered with by an unauthorized person for the purpose of fraudulently altering a record.

An embodiment of the invention is illustrated in the accompanying drawings wherein;

Figure 1 is a perspective view of the instrument. Fig. 2 is a plan view thereof with the cover or face plate removed. Fig. 3 is a plan view similar to Fig. 2 but showing those parts which are exposed to view when the chart carrier and the marking device are removed. Fig. 4 is a vertical diametrical sectional view. Fig. 5 is a detail perspective view of an escapement lever by which the traversing movement of the marker relative to the chart is controlled. Fig. 6 is a detail perspective view of an arm which coacts with the escapement lever and which carries the recording point, and Fig. 7 is a detail perspective view showing an attachment device on the inner face of the cover or face plate.

Similar characters of reference designate corresponding parts throughout the several views.

The operating parts are inclosed in a casing to the body 1 of which there is secured a cover or face plate 2. As shown the casing is of cylindrical form and is designed to be supported in a vertical position, being carried by an attachment bracket 3 which is secured to any suitable part of the machine. The bracket 3 is of inverted V shape, preferably consisting of a suitably folded strip of metal and its legs terminate in out-turned extensions 4 upon which the casing rests. The extensions 4 are preferably apertured to receive retaining studs 5 which project from the cylindrical portion of the casing. The upper or apex portion of the bracket 3 projects beyond the casing and carries a forwardly projecting bail 6 for engagement through a slot in an upright hasp 7 which is fixed to the casing. The instrument is positively connected to the bracket by a padlock 8, the shackle of which passes through the bail 6. It will be apparent that the instrument may be removed as a unit from the machine, without disconnecting the bracket, by simply removing the padlock 8 and lifting the casing from the extensions 4. The V shaped bracket described thus furnishes a compact and strong means of support for the instrument, having positive connection therewith at three points; and at the same time enables the removal or replacement of the instrument as a self contained unit and in an easy and quick manner.

The cover or face plate 2 has on its inner face a lock 9, the bolt of which engages in a keeper 10 secured within the body 1. The plate 2 also carries on its inner face and adjacent its margin, clips 11 (Fig. 7) which are of U shape and are disposed in the plane of the casing, facing toward the margin thereof. The clips 11 (of which three are employed in the embodiment shown) coact with studs 12 which are secured within the casing and retain the plate 2 in position, even when the bolt of the lock is disengaged from the keeper 10. To remove the plate 2, it is first unlocked and then partially rotated, (counter clockwise in the embodiment shown) to disengage the clips 11 from the studs 12. The plate 2 may then be lifted from the body 1 to expose the inclosed parts. The plate 2 is preferably provided with a marginal flange 13 by which it may be readily centered and with a grip 14 by which the instrument may be conveniently handled.

Fraudulent access to the inclosed working parts is guarded against by the use of a ribbon seal 15 in connection with a hasp 16 provided on the plate 2 and a hasp 17 provided on the projecting portion of the bracket 3, the ribbon of the seal 15 passing through alining openings in these hasps. The bracket 3 may be so secured to the vehicle as to render its removal a matter of difficulty, and in such a case, by virtue of the arrangement described the seal not only furnishes protection against the removal of the plate from the casing but against the fraudulent removal of the instrument as a whole from the bracket 3.

The record of use and idleness is made by a marking point 18 upon a chart or record receiving element 19, the chart and the marking point having a continuous and prescribed relative movement and also, when the instrument is subject to vibrations, a vibratory relative movement concomitant with the continuous movement.

The chart 19 in the embodiment shown is in the form of a dial which is calibrated as to time values in the usual manner and is mounted upon a chart carrier 20 in the form of a plate. The plate 20 has an apertured and peripherally grooved hub projection 21 which passes through an opening in the chart and coacts with a spring retaining washer 22, passing also through said washer. The washer 22 is fitted over the central portion of the chart and has pivoted thereon a curved latch finger 23 for engagement in the groove of the projection 21 to secure the washer in position. To remove the chart 19 from the plate 20 the finger 23 is swung outwardly so as to clear the projection 21 and to enable the removal of the washer, and thereupon of the chart, from said plate.

The continuous relative movement of the chart and the marking point is produced by suitable clock mechanism 24, having an hour shaft 25 which, in the embodiment shown, is operatively connected to the plate 20, passing frictionally through the opening in the central hub 21. The clock mechanism is self-contained and is utilized as the weight of a pendulum by which the vibratory movement of the chart and the marking point is produced. Toward this end the clock mechanism is carried by a bracket or hanger 26 which is mounted to swing upon a horizontal pin 27 arranged in the upper portion of the casing and in turn carried by a bracket 27ª. The hanger 26 is of inverted U shape in side elevation and its legs are extended to afford bearings for the shaft 25.

The marking point 18 is pivoted upon an arm 28, being preferably directly attached to a spring pressed carrier 28ª which is pivoted on said arm and by which the point 18 is held in suitable contact with the chart. It will be apparent that the chart will be continuously revolved by the clock mechanism and that the marking point which always has a relatively fixed location will trace a curved mark upon the chart. If the machine is idle, whereby the clock mechanism and the chart carried thereby remain in a bodily fixed position, the curved mark traced by the point 18 will be a line of regular and even character but if the machine is in use, whereby its vibrations are transmitted to the clock mechanism, resulting in bodily swinging movements of the latter and therewith of the chart, the curved mark traced by the point 18 will be in the nature of a zone or band made up of closely associated, zig-zag and substantially radial lines.

The swinging movements of the clock mechanism are suitably cushioned, for instance by leaf springs 29 arranged at each side of the casing of said mechanism. The swinging movements of the clock mechanism are moreover positively limited by a stop plate 30 secured to the hanger 26 above the clock mechanism and provided with resilient or springy extensions 31 which engage posts 32 and 33.

Where the chart employed is adapted to receive a record covering a number of days, the arm 28 is mounted to swing toward the center of the dial, for this purpose being pivoted upon the post 32. In such a case the means for controlling the inward swinging movement of the arm 28 is preferably of the following construction. An escapement lever 34 is mounted upon the post 33 and is of substantially bell crank form, overlying the arm 28 and having an extension which is pivoted to a link 35. Said link is in turn pivoted upon a disk 36 which is mounted eccentrically on the hour shaft 25. The lever 34 coacts with teeth 37 which are struck up in a curved path at the outer end of the arm 28. The teeth 37 are preferably arranged in a single row and are engaged by teeth 38 provided on the lever 34. The teeth 38 comprise a pair and are arranged in offset relation in such manner that when one of the teeth 38 disengages a tooth 37, the other tooth 38 will engage the next adjacent tooth 37. The lever 34 holds the arm 28 against the tension of a spring 39 by which said arm is moved inwardly in a step by step manner and in accordance with the action of the lever 34. In this connection it may be noted that the link 35 is disposed approximately in a line which extends perpendicularly between the shaft 25 and the suspension pin 27 and that the pivotal connection of said link with the lever 34 is substantially coincident with the pin 27; consequently the swinging movements of the pendant clock mechanism are without appreciable effect upon the lever 34 and will not produce any perceptible change in the position of said lever.

The lever 34 is actuated at intervals of twelve hours to release the arm 28 and permit a movement thereof by the spring 39 through a distance corresponding to one half the interval between a pair of adjacent teeth 37, the lever 34 being rocked first in one direction and then in the other. Each time that the lever is rocked the arm 28 moves inwardly through the prescribed distance and it follows that the complete record will be produced in the form of a series of concentric half circles A successively decreasing in diameter by constant decrements and successively joined at their terminations by short lines B traced by the marking point 18 during the inward swinging movement of the arm 28. The location of the pivot 32 of the arm 28 is so selected that the lines B approximate in direction the theoretically correct directions along which the marking point will make its substantially radial tracings during the vibrations of the pendant clock mechanism. The clock mechanism is wound by a key which is inserted through the hollow hour shaft 25 and is regulated by a lever which is exposed through an opening 40 in the forward arm of the hanger 26. To reset the arm 28 the latter may be sprung so that its teeth 37 clear the teeth 38 of the lever 34 and then swung outwardly to a position in which the point 18 comes adjacent the periphery of the chart.

The instrument herein described is very simple in its construction and sensitive and reliable in its operation. It embodies relatively few parts and these are easily accessible for whatever purposes required.

Having fully described my invention, I claim:—

1. A vibration recorder comprising a support, a recording marker held non-vibratable relatively to said support, and a clock operated support for a recording surface vibratable relatively to said recording marker.

2. A vibration recorder comprising a support, a recording marker held non-vibratable relatively to said support, and a clock mechanism provided with an hour shaft carrying a dial plate for supporting a recording surface, said clock mechanism being vibratable relatively to said recording marker.

3. In an apparatus of the type set forth, recording means comprising a dial plate for supporting a recording surface, and a marking point operating thereon, a pivotally suspended hanger, a swinging clock mechanism carried by the hanger and having an hour shaft upon which the dial plate is mounted, and devices for limiting and cushioning the swinging movements of the clock mechanism.

4. In an apparatus of the type set forth, recording means comprising a support, a marker held non-vibratable relatively to said support, a support for a recording surface, and a clock mechanism operatively connected with said recording surface support to produce a continuous movement of the support and vibratable relatively to the marker to impart a corresponding movement to the support, and means operated by the clock mechanism for changing the position of the marker with relation to the recording surface support in accordance with transitions from one period of time to another.

5. In an apparatus of the type set forth, a support, a recording marker held non-vibratable relatively to said support, a clock mechanism provided with an hour shaft carrying a dial plate for supporting a recording surface and vibratable relatively to the recording marker, and means operated by the clock mechanism for progressively moving the marker toward the center of the dial plate.

6. In an apparatus of the type set forth, a pivoted spring pressed arm carrying a recording marker, a clock mechanism provided with an hour shaft carrying a dial plate for supporting a recording surface and vibratable relatively to said marker, and an escapement lever operated by the clock mechanism, and controlling the inward movement of said arm.

7. In an apparatus of the type set forth, a pivoted spring pressed arm carrying a recording marker, a pivoted clock mechanism provided with an hour shaft carrying a dial plate for supporting a recording surface and vibratable relatively to said marker, and an escapement lever and a link pivoted to the escapement lever in line with the pivot of the clock mechanism, the link being pivoted eccentrically on the hour shaft.

In testimony whereof I affix my signature in presence of two witnesses.

WILLIAM HIRAM BROWN.

Witnesses:
R. A. MALM,
ROBT. J. MITCHELL.